United States Patent Office 2,880,067
Patented Mar. 31, 1959

2,880,067

PROCESS FOR PREPARING METAL CARBONYLS

Rex D. Closson, Northville, and George G. Ecke, Ferndale, Mich., and Lloyd R. Buzbee, Huntington, W. Va., assignors to Ethyl Corporation, New York, N.Y., a corporation of Delaware No Drawing. Application October 3, 1956
Serial No. 613,595

11 Claims. (Cl. 23—203)

This invention relates to transition metal carbonyls and to a novel method for the preparation of these compounds, particularly chromium and manganese carbonyls.

The transition metal carbonyls are useful compounds both as chemical intermediates and in certain direct commercial uses. In the past great difficulty has been experienced in preparing certain of these transition metal carbonyls in high enough yield to make their use commercially feasible. In particular no process has been known heretofore which produces manganese carbonyl in sufficient yield to make its industrial application an achieved practicality, even though this compound is known to have valuable utility both as an antiknock agent in liquid hydrocarbon fuels, and as an intermediate for preparing other manganese compounds.

It is, therefore, an object of this invention to provide a novel process for the synthesis and manufacture of transition metal carbonyls. Another object is to provide a process for the manufacture of chromium carbonyl. A particular object of this invention is to provide a process for the production of manganese carbonyl in good yield.

The above and other objects of this invention are accomplished by a process for preparing transition metal carbonyls which comprises reacting carbon monoxide with a compound having the formula.

$$\left[\begin{array}{c} R_1\ R_3 \\ R_2-C-A- \\ R_1-C-A- \\ R_2\ R_3 \end{array}\right]_x M_y$$

where A is an element of group V of the periodic table having an atomic number no greater than 15, i.e., nitrogen and phosphorus, $R_1$ and $R_2$ are organic groups characterized by the absence of (1) olefinic unsaturation and (2) a hydrogen atom on the carbon atom immediately adjacent the carbon atom to which the group V element is bonded, $R_3$ is an organic radical, M is a transition metal, $x$ and $y$ depend upon the valence of M, $x$ ranging from 1 to 3 inclusive, and $y$ ranging from 1 to 2 inclusive. By transition metal is meant a metal of groups IVB, VB, VIB, VIIB and VIII of the periodic table.

The compound elucidated in the above general formula is referred to herein as "the transition metal intermediate" and is formed, for example, as the reaction product of a transition metal salt and a "non-transition metal intermediate." This latter intermediate is conveniently prepared by reacting a metal with an organic compound having the formula:

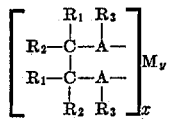

wherein $R_1$, $R_2$, $R_3$ and A are as defined above. The intermediates in this reaction have formulae corresponding to:

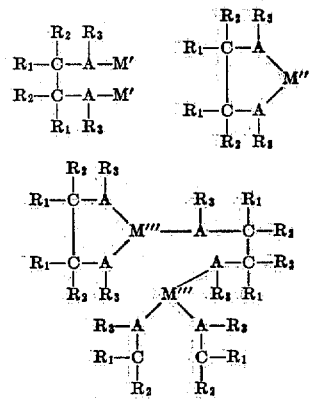

wherein M', M" and M"' represent mono-, di-, and trivalent metals respectively, A, $R_1$, $R_2$ and $R_3$ are as defined above. The non-transition metals preferred in the preparation of these intermediates include the alkali metals, alkaline earth metals, and aluminum.

The radical $R_3$ in the above formulae is an organic radical inclusive of alkyl, aryl, alkenyl, alkaryl, aralkyl radicals and the like. These radicals contain from 1 to about 16 carbon atoms. Organic hydrocarbon radicals are preferred.

A preferred class of compounds for use in the preparation of the metal-containing intermediates referred to above are those in which A in the above formulae is nitrogen; that is, an imine compound. Compounds of this type are preferred as they are more readily prepared than the corresponding phosphorus compound, and their use leads to excellent yields of metal carbonyls. N-benzohydrylidenephenylimine which has the formula:

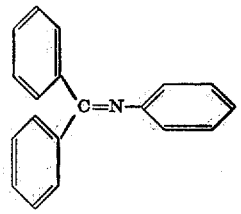

serves as an example.

Therefore, a preferred embodiment of this invention is a process which comprises reacting carbon monoxide with a transition metal-containing intermediate, which intermediate is formed as the reaction product of a transition metal salt and monosodio benzohydrylidenephenylimine. This embodiment of the invention is particularly applicable of the synthesis of manganese carbonyl.

The non-transition metal intermediate is prepared from the metal and an imine meeting the above requirements, by adding the metal to an equivalent amount of the imine compound. Alternatively, the reverse procedure may be employed when convenient. When the metal is particularly reactive the process is preferably carried out in an inert atmosphere under conditions such that neither the metal nor the product intermediate come in contact with the air. Thus, for example, a dispersion of sodium in mineral oil is added to benzohydrylidenephenylimine while the system is agitated and kept under a nitrogen atmosphere. It is often advisable to heat the mixture at reflux to prepare the non-transition metal intermediate.

The transition metal intermediate is conveniently prepared from the non-transition metal intermediate by metal interchange. That is, a salt of the transition metal is reacted with the non-transition metal intermediate. Elevated temperatures are employed when necessary to complete the reaction.

The transition metal intermediate is also prepared by reacting an appropriate imine with a non-transition metal in the presence of a transition metal salt. In this manner the transition metal intermediate is prepared from the non-transition metal intermediate as the latter is formed.

The process of this invention is conveniently carried out in an inert solvent. A preferred class of solvents comprise cyclic ethers such as dioxane and tetrahydrofuran.

The transition metal intermediate is reacted with carbon monoxide in the process of this invention to form the transition metal carbonyl. This carbonylation is carried out in a sealed vessel at elevated temperatures and pressures. A preferred method of carrying out the reaction with carbon monoxide comprises pressurizing the vessel with carbon monoxide while the contents of the vessel, that is, the reaction mixture from the preparation of the transition metal intermediate is at room temperature. After the vessel has been pressurized with carbon monoxide and sealed it is then heated slowly to the reaction temperature and allowed to remain at that temperature until the reaction is substantially complete. Reaction temperatures of from about 50° C. to about 500° C. and pressures from about 200 to about 10,000 p.s.i.g. are employed. Reaction time of from about ½ hour to about 10 hours is ordinarily sufficient.

Embodiments of the instant invention will become apparent by reference to the following specific examples in which all parts and percentages are by weight.

*Example I*

To a glass reaction vessel equipped with gas and liquid inlet means, heating means and reflux condenser was charged 800 parts of tetrahydrofuran and 129 parts of N-benzohydrylidenephenylimine. The contents of the vessel were kept under an atmosphere of nitrogen and the temperature was controlled at 20° C. while 23 parts of a 50 percent sodium dispersion in mineral oil were added. After the sodium addition was completed, 31.5 parts of manganous chloride were added while the mixture was agitated. The resultant intermediate was charged to a pressure resistant vessel having a plurality of gas inlet and outlet means, pressure and temperature measuring devices, heating and cooling means, and an arrangement for charging and discharging liquids and solids. The vessel was flushed with nitrogen and pressurized with carbon monoxide at room temperature and heated gradually over a 50-minute period to a maximum temperature of 150° C. and a maximum pressure of 3000 p.s.i.g. These conditions were maintained for an additional 40 minutes, after which time the vessel was cooled, vented and the contents discharged. The reaction mixture was hydrolyzed with 200 parts of water and steam distilled. The portion distilling above 80° C. was extracted with benzene; the benzene extract was concentrated by distillation and 5.8 parts of dimanganese decacarbonyl, $[Mn(CO)_5]_2$, melting at 149–152° C. were recovered. This material is a yellow orange crystalline solid melting at 156° C. when pure. Flame photometric analysis of the benzene extract before concentration indicated that the reaction produced a total of over 12 parts of dimanganese dicarbonyl representing approximately a 25 percent yield.

*Example II*

The general procedure of Example I was followed with the following differences: The reaction intermediate which was charged to the pressure resistant vessel was prepared from 90 parts of benzohydrylidene-n-hexylimine, 630 parts of tetrahydrofuran as a solvent, 15.6 parts of sodium dispersion, and 21.4 parts of manganous chloride. The pressure resistant vessel was heated under carbon monoxide pressure over a one hour period to 200° C. and 3000 p.s.i.g. These conditions were maintained for 30 minutes. The reaction gave an 11 percent yield of dimanganese decacarbonyl as measured by the flame photometer.

*Example III*

The procedure of Example I is repeated except that 78 parts of N-methyl-2,2,4,4-tetramethyl-3-iminopentane are used to prepare the intermediate, and the reaction with carbon monoxide is conducted at a total pressure of 250 p.s.i.g. at 50° C. for a total of three hours and 40 minutes which time includes 40 minutes necessary to bring the reaction vessel to reaction conditions. A good yield of dimanganese decacarbonyl results.

*Example IV*

To a glass reaction vessel of the type described in Example I is added 350 parts of n-decyl-p,p'-dimethyl benzohydrylidenimine $(p-CH_3C_6H_5)_2C=N—C_{10}H_{21}$, 450 parts of dioxane and 107 parts of manganous bromide. To this mixture is added 40 parts of potassium in incremental portions. The temperature of the vessel is maintained between 20 and 30° C. during the potassium addition. When the addition is completed, the mixture is refluxed for about half an hour, cooled and charged to a pressure resistant vessel of the type described in Example I. The vessel is sealed, charged with carbon monoxide, and heated over approximately a one and a half hour period to 300° C. and a maximum pressure of 10,000 p.s.i.g. These conditions are maintained for an additional 30 minutes, after which time the vessel is cooled, vented and the contents are discharged, hydrolyzed and rectified as described above to produce a good yield of dimanganese decacarbonyl.

The reaction mixture obtained on an addition of the metal to a mixture of imine compound and the transition metal salt in an appropriate solvent is less viscous than the product obtained when the transition metal salt is added to the reaction product of the metal and the organic compound. Thus, the procedure used in Example IV greatly facilitates handling of the intermediates from the glass reaction vessel to the pressure vessel used in the carbonylation step of the reaction. Substantially identical yields are obtained under identical conditions of temperature, pressure and time of reaction regardless of the manner of preparation of the transition metal intermediate. The procedure as outlined in Example IV is preferred as the final reaction mixture is more easily handled and is prepared with one less reaction step than is necessary when the metal is reacted initially with the imine in the absence of the transition metal salt.

As a variant in the above procedure, the metal may be added to the mixture of the organic compound, the transition metal salt and the solvent while the mixture is maintained at reflux temperature. This latter method is advantageous in that a portion of the heat liberated by the metal addition is utilized in the process.

*Example V*

The procedure of Example IV is repeated using 9 parts of aluminum, 63 parts of manganous chloride, 600 parts of the dimethyl ether of ethylene glycol as a solvent and 322 parts of p,p'-dichlorobenzohydrylidene benzyl phosphine $(p-ClC_6H_4)_2C=P—CH_2C_6H_5$. The carbonylation reaction is carried out at 200° C. and 50,000 p.s.i.g. for 15 minutes after a preliminary heating period of one hour. A good yield of dimanganese decacarbonyl results.

*Example VI*

The procedure of Example V is repeated except that the preliminary heating is conducted in the absence of carbon monoxide, and when the reaction mixture reaches 200° C., the vessel is pressurized with carbon monoxide to 50,000 p.s.i.g. and the mixture reacted for 15 minutes.

A greatly reduced yield of dimanganese decacarbonyl results.

Example VII

The procedure of Example IV is repeated using 800 parts of tetrahydrofuran, 53 parts of chromic chloride, 44 parts of strontium metal and 290 parts of 3,3,5,5-tetramethyl - 4 - heptylidene - m - ethylphenyl phosphine [$CH_3CH_2C(CH_3)_2$]$_2C=P-(m-C_2H_5C_6H_4)$. The carbonylation reaction is carried out at 3000 p.s.i.g. and 200° C. for 30 minutes after a one hour period to bring the reaction mixture to these conditions. A good yield of chromium hexacarbonyl results.

Example VIII

The procedure of Example VII is followed using 500 parts of dioxane, 66 parts of chromic sulfate, 6 parts of magnesium metal and 130 parts of benzohydrylidenephenylimine. An excellent yield of chromium hexacarbonyl results.

Example IX

A good yield of dimanganese decacarbonyl is produced following the general procedure of Example VII using 600 parts of dioxane, 87 parts of manganous acetate, 23 parts of sodium and 232 parts of $(C_6H_5)_2C=P-CH_3$, benzohydrylidenemethylphosphine.

Example X

Example VII is repeated using 900 parts of toluene, 113 parts of chromic iodide, 23 parts of sodium and 355 parts of p,p'-dinitrobenzohydrylidene-n-hexylimine. A lower yield of chromium carbonyl results than that achieved in Example VIII due to the non-polar nature of the solvent.

The organic portion of the transition metal intermediate which is reacted with carbon monoxide in the practice of this invention is derived from an imino compound or the corresponding phosphorus compound in which the imino carbon is substituted with two organic radicals and which contains no hydrogen on a carbon atom adjacent the imino carbon. These compounds have at least 10 carbon atoms, and those having up to 25 carbon atoms in the molecule are suitable in the practice of this invention. Examples of such compounds are p,p'-diaminobenzohydrylidene methylimine, p,p'-diphenylbenzohydrylidene - n - hexyl phosphine, m,m' - dinitrobenzohydrylidene benzyl phosphine, 4,4,6,6-tetramethyl-5-nonylidene ethylimine, and the like.

However, a preferred class of compounds comprise the imines which have no hydrogen alpha to the imino carbon and which contain from 10 to about 20 carbon atoms. These compounds are preferred as it has been found that a good yield of metal carbonyl is produced when they are employed. Examples of these include benzohydrylidenephenylimine, 2,2,4,4,-tetramethyl - 3 - pentylidene methylimine, p-methylbenzohydrylidene benzylimine, benzohydrylidene-n-hexylimine, 2,4-diethyl-2,4-dimethyl-3-pentylidene-p-nitrophenylimine and the like.

The non-transition metal which is reacted with the imine in preparing the intermediate is a reactive metal selected from the group consisting of alkali metals, alkaline earth metals, aluminum and the like. Thus, sodium, lithium, potassium, rubidium, cesium, beryllium, magnesium, calcium, strontium, barium and aluminum are all useful in preparing the non-transition metal intermediate in the practice of this invention. The alkali metals are preferred as it is found that high yields of carbonyl are obtained by their use. Of the alkali metals, sodium is particularly preferred as it is readily available and reacts rapidly with the ketone to give a high yield of the intermediate.

When the metal used is one which is sensitive to air or water, it is preferably used in the form of a dispersion in a suitable inert carrier such as anhydrous mineral oil. It is often advisable to add the metal in amalgamated form to insure reaction.

The transition metal compounds which are used in the process of this invention to produce the transition metal intermediate include generally the ionic compounds of the metal such as the halides including the bromides, iodides and chlorides, the nitrates, sulfates, oxalates, acetates and other ionic organic and inorganic salts. Examples of these are $MnCl_2$, $MnBr_2$, $MnI_2$, $MnSO_4$, manganous oxalate, manganous acetate, $CrCl_3$, $CrBr_3$, $CrI_3$, chromic acetate, chromic sulfate, and the like.

The process of this invention is most advantageously carried out in a suitable solvent. In general, organic solvents which are inert to the reactants under the conditions of the reaction are suitable. Examples of suitable solvents include benzene, toluene, hexane and like hydrocarbons. Particularly good results are obtained when the solvent employed is an inert, polar, non-reactive cyclic ether, such as dioxane. Tetrahydrofuran is a particularly preferred solvent of this latter type.

When the transition metal intermediate is reacted with carbon monoxide at elevated temperature and pressure higher yields of carbonyl are obtained when the intermediate is contacted with carbon monoxide at temperatures and pressures substantially below final reaction conditions. If, after this initial contact the reaction mass is then heated to the proper conditions of temperature and pressure a good yield of carbonyl results. The process of this invention is also operative when the transition metal intermediate is heated in the absence of carbon monoxide and then contacted with carbon monoxide at elevated temperatures. However, the yield of carbonyl produced by this procedure is substantially lower as illustrated by Example VI.

The carbonylation step is conveniently carried out at carbon monoxide pressures of from about 250 p.s.i.g. to pressures above 50,000 p.s.i.g. Pressures of from 500 p.s.i.g. to 10,000 p.s.i.g. are preferred as a good yield of metal carbonyl can be separated from the reaction mixture when pressures in this range are employed. Pressures of from 500 to 3,000 p.s.i.g. are particularly preferred as they can be safely obtained in readily available processing equipment.

Within the pressure range outlined above the carbonylation step is conveniently carried out at temperatures between 50 and 300° C. Temperatures of from 150 to 230° C. are preferred as an excellent yield of carbonyl is produced at these temperatures.

After the reaction mixture in contact with carbon monoxide reaches reaction conditions the temperature and carbon monoxide pressure are conveniently maintained until the reaction has produced a high yield of metal carbonyl. If desired, reaction conditions can be maintained until the system no longer absorbs carbon monoxide. However, reaction times of as little as 15 minutes can be employed to give a satisfactory yield of carbonyl. Generally, reaction times of between 0.5 hour and 2.5 hours are preferred as excellent yields of carbonyl are obtained in this manner.

The amount of solvent employed in the process of this invention is dependent upon the fluidity required of the reaction mass prior to the carbonylation step and the method of preparation of the transition metal intermediate. When the intermediate is prepared as described in Example IV a lower proportion of solvent can be employed due to the increased fluidity of the reaction mass. However, when the procedure used in Example I is followed a more viscous intermediate results and thus a higher concentration of solvent is necessary particularly when the intermediate is prepared in a vessel other than that in which the carbonylation is conducted. In general, an amount of solvent equivalent to a weight ratio of from 4:1 to 30:1 of solvent to organic imine employed is used. The preferred range comprises a solvent to imine weight ratio of from 5:1 to 10:1 as low viscosity intermediates which yield a high proportion of metal carbonyl are prepared from reaction mixtures employing these proportions of solvents.

The metal carbonyl is recovered from the final reaction mixture by hydrolysis and steam distillation followed by extraction of the distillate with a suitable solvent and crystallization of the carbonyl from the solvent. For example, dimanganese decacarbonyl is extracted from the steam distillate by the use of such inert organic solvents as cyclohexane, benzene, toluene and the like.

As pointed out above the transition metal carbonyls prepared by the process of this invention find utility as fuel additives, and in particular manganese carbonyl is an antiknock agent of outstanding effect in gasoline and other liquid hydrocarbon fuels.

The term "gasoline" pertains to liquid hydrocarbons and is inclusive of mixtures of aliphatic, olefinic, aromatic and naphthenic hydrocarbons derived from mineral sources such as petroleum, coal, shale and tar sands, and which includes straight run, reformed, cracked and alkylated stocks, and mixtures of these. The initial boiling point can be from about 70 to about 90° F. and the final boiling points vary from less than 300 to more than 440° F.

To a gasoline meeting the above requirements was added various quantities of dimanganese decacarbonyl and the mixtures were agitated to give a homogeneous fuel blend. Tests were conducted of these fuel blends using a single cylinder CFR standard test engine according to the American Society for Testing Materials; procedure D908–51 to determine the octane number of the fuel containing the dimanganese decacarbonyl and the identical fuel with no antiknock additive. This procedure is referred to as the Research Method for Antiknock Testing. The addition of dimanganese decacarbonyl in quantities sufficient to give 0.5, 1.0, and 1.5 grams of manganese per gallon of fuel, resulted in fuels having octane ratings of 84.9, 88.1, and 90.8 respectively. The fuel which contained no dimanganese decacarbonyl gave an octane number rating of 77.1. 3.75 grams of lead as tetraethyllead are required to produce an octane number increase in this fuel equal to that produced by the addition of 1.5 grams of manganese as dimanganese decacarbonyl. The dimanganese decacarbonyl is, therefore, 2.5 times as effective as tetraethyllead.

When employed as an antiknock agent, the dimanganese decacarbonyl prepared by the process of this invention is conveniently used in conjunction with other fuel additives. Thus, other antiknock agents scavengers, dyes and antioxidants are advantageously added to the fuel along with metal carbonyl. Similarly, antiknock fluid compositions containing any or all of the above ingredients in addition to the metal carbonyl find utility as fuel additives.

The various other metal carbonyls such as chromium, iron carbonyl, nickel carbonyl, cobalt, and the like, find various uses which are well known in the art. For example, chromium carbonyl and iron carbonyl find utility in the gas phase plating of other metals. Further, these compounds are a convenient source of the pure metal by the decomposition of the carbonyl.

We claim:

1. A process for preparing a transition metal carbonyl which comprises reacting carbon monoxide with a compound having the formula:

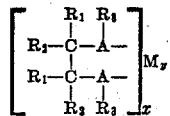

where A is an element of group V of the periodic table having an atomic number no greater than 15, $R_1$ and $R_2$ are organic hydrocarbon groups characterized by the absence of (1) olefinic unsaturation and (2) a hydrogen atom on the carbon atom immediately adjacent the carbon atom to which the group V element is bonded, $R_3$ is an organic hydrocarbon radical, M is a transition metal selected from the class consisting of the metals of groups IVB, VB, VIB, VIIB and VIII of the periodic table, $x$ and $y$ depend upon the valance of M, $x$ ranging from 1 to 3 inclusive and $y$ ranging from 1 to 2 inclusive.

2. The process of claim 1 wherein said group V element is nitrogen.

3. The process for the preparation of dimanganese decacarbonyl which comprises reacting carbon monoxide with the compound represented by the formula:

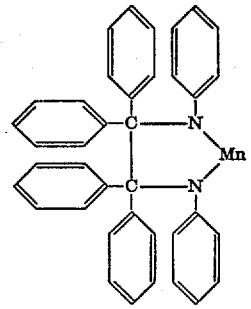

4. A process for preparing a group VIIB metal carbonyl which comprises reacting carbon monoxide with a compound having the formula

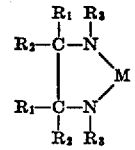

where $R_1$ and $R_2$ are organic hydrocarbon groups characterized by the absence of (1) olefinic unsaturation and (2) a hydrogen atom on the carbon atom immediately adjacent the carbon atom bonded to nitrogen, $R_3$ is an organic hydrocarbon radical, and M is a group VIIB transition metal.

5. The process of claim 4 where the group VIIB transition metal is manganese.

6. A process for the preparation of a transition metal carbonyl which comprises the steps of (A) reacting a nontransition metal selected from the class consisting of alkali metals, alkaline earth metals and aluminum with a compound having the formula

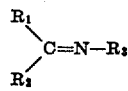

where $R_1$ and $R_2$ are organic hydrocarbon groups characterized by the absence of (1) olefinic unsaturation and (2) a hydrogen atom on the carbon atom immediately adjacent the carbon atom bonded to nitrogen and $R_3$ is an organic hydrocarbon radical; (B) reacting the product from step (A) with a transition metal salt selected from the class consisting of salts of the metals of groups IVB, VB, VIB, VIIB and VIII of the periodic table and (C) reacting carbon monoxide with the product of step (B).

7. The process of claim 6 where the transition metal salt is a group VIIB metal salt.

8. The process of claim 7 where the group VIIB metal salt is a manganous salt.

9. Process of claim 8 where the manganous salt is manganous chloride.

10. Process for the preparation of dimanganese decacarbonyl which comprises the steps of (A) reacting sodium with N-benzohydrylidenephenylimine; (B) reacting the product of (A) with manganous chloride; and (C) reacting the product of (B) with carbon monoxide at 150° C. and a maximum carbon monoxide pressure of 3000 p.s.i.g.

11. The process of claim 1 wherein the reaction is conducted at temperatures of from 50 to about 500° C.

and carbon monoxide pressures of from about 200 to about 10,000 p.s.i.g.

References Cited in the file of this patent

Deming: "General Chemistry," 5th edition, John Wiley and Sons, Inc., New York, copyright 1944 (final page relied on).